United States Patent
Wu et al.

(10) Patent No.: US 9,411,906 B2
(45) Date of Patent: *Aug. 9, 2016

(54) SUGGESTING AND REFINING USER INPUT BASED ON ORIGINAL USER INPUT

(71) Applicant: GOOGLE INC., Mountain View, CA (US)

(72) Inventors: Jun Wu, Saratoga, CA (US); Dekang Lin, Cupertino, CA (US); Zhe Qian, Saratoga, CA (US); Jie Zhou, Beijing (CN)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,555

(22) Filed: Apr. 14, 2015

(65) Prior Publication Data

US 2015/0220547 A1    Aug. 6, 2015

Related U.S. Application Data

(63) Continuation of application No. 13/615,518, filed on Sep. 13, 2012, now Pat. No. 9,020,924, which is a continuation of application No. 11/122,873, filed on May 4, 2005, now Pat. No. 8,438,142.

(51) Int. Cl.
*G06F 17/30* (2006.01)
*G06F 7/00* (2006.01)

(52) U.S. Cl.
CPC ........ *G06F 17/3097* (2013.01); *G06F 17/3053* (2013.01); *G06F 17/3064* (2013.01); *G06F 17/30389* (2013.01)

(58) Field of Classification Search
CPC ............ G06F 9/5066; G06F 17/30306; G06F 17/30321; G06F 17/3056
See application file for complete search history.

(56) References Cited

U.S. PATENT DOCUMENTS

5,265,065 A    11/1993   Turtle
5,331,554 A     7/1994   Graham
(Continued)

FOREIGN PATENT DOCUMENTS

CN    1460948      12/2003
EP    1 587 011    10/2005
(Continued)

OTHER PUBLICATIONS

B. Giff-Schmitt, International Preliminary Report on Patentability in PCT/US2006/016787, mailed Nov. 6, 2007, 6 pages.
(Continued)

*Primary Examiner* — Angelica Ruiz
(74) *Attorney, Agent, or Firm* — Fish & Richardson P.C.

(57) ABSTRACT

Systems and methods to generate modified/refined user inputs based on the original user input, such as a search query, are disclosed. The method may be implemented for Roman-based and/or non-Roman based language such as Chinese. The method may generally include receiving an original user input and identifying core terms therein, determining potential alternative inputs by replacing core term(s) in the original input with another term according to a similarity matrix and/or substituting a word sequence in the original input with another word sequence according to an expansion/contraction table where one word sequence is a substring of the other, computing likelihood of each potential alternative input, and selecting most likely alternative inputs according to a predetermined criteria, e.g., likelihood of the alternative input being at least that of the original input. A cache containing pre-computed original user inputs and corresponding alternative inputs may be provided.

20 Claims, 10 Drawing Sheets

(56) References Cited

U.S. PATENT DOCUMENTS

| | | | |
|---|---|---|---|
| 5,418,948 A | 5/1995 | Turtle |
| 6,006,221 A | 12/1999 | Liddy et al. |
| 6,006,225 A | 12/1999 | Bowman et al. |
| 6,131,082 A | 10/2000 | Hargrave, III et al. |
| 6,169,986 B1 | 1/2001 | Bowman et al. |
| 6,182,066 B1 | 1/2001 | Marques |
| 6,314,419 B1 | 11/2001 | Faisal |
| 6,345,244 B1 | 2/2002 | Clark |
| 6,411,950 B1 | 6/2002 | Moricz et al. |
| 6,510,406 B1 | 1/2003 | Marchisio |
| 6,571,234 B1 | 5/2003 | Knight et al. |
| 6,611,825 B1 | 8/2003 | Billheimer et al. |
| 6,633,868 B1 | 10/2003 | Min et al. |
| 6,757,646 B2 | 6/2004 | Marchisio |
| 6,847,966 B1 | 1/2005 | Sommer et al. |
| 6,882,970 B1 | 4/2005 | Garner et al. |
| 6,947,930 B2 | 9/2005 | Anick et al. |
| 6,961,719 B1 | 11/2005 | Rai |
| 7,054,812 B2 | 5/2006 | Charlesworth et al. |
| 7,089,236 B1 | 8/2006 | Stibel |
| 7,593,921 B2 | 9/2009 | Goronzy |
| 7,636,714 B1 | 12/2009 | Lamping et al. |
| 8,019,748 B1 | 9/2011 | Wu et al. |
| 8,086,504 B1 | 12/2011 | Dicker et al. |
| 2002/0052740 A1 | 5/2002 | Charlesworth et al. |
| 2002/0052894 A1 | 5/2002 | Bourdoncle et al. |
| 2002/0103798 A1 | 8/2002 | Abrol et al. |
| 2002/0156763 A1 | 10/2002 | Marchisio |
| 2003/0028512 A1 | 2/2003 | Stensmo |
| 2003/0101177 A1 | 5/2003 | Matsubayaski et al. |
| 2003/0149704 A1 | 8/2003 | Yayoi et al. |
| 2003/0208473 A1 | 11/2003 | Lennon |
| 2003/0217047 A1 | 11/2003 | Marchisio |
| 2003/0217052 A1 | 11/2003 | Rubenczyk et al. |
| 2003/0231209 A1 | 12/2003 | Kappe et al. |
| 2004/0086185 A1 | 5/2004 | Sun |
| 2004/0158560 A1 | 8/2004 | Wen et al. |
| 2004/0186827 A1 | 9/2004 | Anick et al. |
| 2005/0021517 A1 | 1/2005 | Marchisio |
| 2005/0076003 A1 | 4/2005 | DuBose et al. |
| 2005/0080782 A1 | 4/2005 | Ratnaparkhi et al. |
| 2005/0149496 A1 | 7/2005 | Mukherjee et al. |
| 2005/0210010 A1 | 9/2005 | Larson et al. |
| 2005/0234879 A1 | 10/2005 | Zeng et al. |
| 2005/0234972 A1 | 10/2005 | Zeng et al. |
| 2005/0289463 A1 | 12/2005 | Wu et al. |
| 2006/0106769 A1 | 5/2006 | Gibbs |
| 2006/0112091 A1 | 5/2006 | Chapman et al. |
| 2006/0200556 A1 | 9/2006 | Brave et al. |
| 2006/0253427 A1 | 11/2006 | Wu et al. |
| 2006/0287993 A1 | 12/2006 | Yao et al. |
| 2008/0040314 A1 | 2/2008 | Brave et al. |
| 2008/0172164 A1* | 7/2008 | Noda ............... G06F 11/1433 701/99 |
| 2008/0183685 A1 | 7/2008 | He et al. |
| 2008/0195601 A1 | 8/2008 | Ntoulas et al. |
| 2008/0256061 A1 | 10/2008 | Chang et al. |
| 2009/0094221 A1 | 4/2009 | Cameron et al. |
| 2009/0171929 A1 | 7/2009 | Jing et al. |
| 2009/0248510 A1 | 10/2009 | Ahluwalia |
| 2009/0248669 A1 | 10/2009 | Shetti et al. |
| 2010/0185644 A1 | 7/2010 | Gutt et al. |
| 2010/0205202 A1 | 8/2010 | Yang et al. |
| 2010/0211588 A1 | 8/2010 | Jiang et al. |
| 2010/0228710 A1 | 9/2010 | Imig et al. |

FOREIGN PATENT DOCUMENTS

| | | |
|---|---|---|
| JP | 2005-084943 | 3/2005 |
| WO | WO 2004/086192 | 10/2004 |
| WO | WO 00/79436 | 12/2004 |
| WO | WO 2005/013153 | 2/2005 |
| WO | WO 2005/026989 | 3/2005 |

OTHER PUBLICATIONS

C. Dumitrescu, International Search Report in PCT/US2006/016787, mailed Aug. 24, 2006, 5 pages.

Notification of the First Office Action for Chinese Application Serial No. 200680021940.2, dated Nov. 13, 2009, 14 pages. (English translation included).

Notification of the Second Office Action for Chinese Application Serial No. 200680021940.2, dated Jul. 5, 2010, 9 pages. (English translation included).

Dupret et al., "Recommending Better Queries Based on Click-Through Data," In: Apostolico, A., Melucci, M. (eds.) SPIRE 2004, LNCS, vol. 3246, pp. 1-12., Springer, Heidelberg (2004).

Huang et al., "Relevant Term Suggestion in Interactive Web Search Based on Contextual Information in Query Session Logs," Journal of the American Society for Information Science and Technology, 2003, 54(7):638-649.

Kim et al, "A Comparison of Collocation-based Similarity Measures in Query Expansion," Information Processing and Management, Jan. 1999, 35:19-30.

Kou et al, "Similarity Model and Term Association for Document Categorization," IEEE Proceedings of the $13^{th}$ International Workshop on Database and Expert Systems Applications, 2002, 5 pages.

Microsoft Computer Dictionary, Fifth Edition, Copyright 2002, 1 page.

Qiu et al., "Concept Based Query Expansion", SIGIR Forum, ACM, New York, NY, US, Jun. 27, 1993, pp. 160-169.

Wen et al., "Query Clustering Using User Logs," 2002, ACM Transactions on Information Systems, Jan. 2002, 20(1):59-81.

Wenxiang et al., "Knowledge Discovery of Usage for Chinese Words Based on DSMA", Computer Applications and Software, 22(1):90-92, Jan. 2005 (English Abstract).

Yeung et al, Improving Performance of Similarity-Based Clustering by Feature Weight Learning, IEEE Transactions on Pattern Analysis and Machine Intelligence, Apr. 2002, 24(4):556-561.

First Office Action for Japanese Patent Application Serial No. 2008-510125, dated Nov. 15, 2011, 5 pages.

Office Action from related Chinese Patent Application No. 200680021940.2, dated Feb. 29, 2012, 7 pages.

Notice of Preliminary Rejection from related Korean Patent Application No. 2007-7028339, dated Oct. 4, 2012, 13 pages.

Office Action issued in Chinese Application No. 201210199408.7 on Feb. 4, 2015, 19 pages (with English translation).

* cited by examiner

| Feature | Count |
|---|---|
| L:because | 1 |
| R:assess | 1 |
| L:rates | 0.5 |
| L:between | 0.5 |
| R:is | 0.33 |
| R:by | 0.33 |
| R:using | 0.33 |

FIG. 5

| Feature | Count | MI |
|---|---|---|
| L:outlying | 530 | 7.16619 |
| L:disadvantaged | 682.49 | 6.61504 |
| L:marginalized | 75.66 | 5.84836 |
| L:close-knit | 97.5 | 5.79445 |
| L:enriching | 123.5 | 5.78579 |
| L:Mountain | 2856 | 5.74945 |
| L:Appalachian | 63 | 5.29764 |
| L:bedroom | 498.5 | 5.08576 |
| R:across | 6285.07 | 4.83219 |
| R:bordering | 60 | 4.51492 |
| R:clashed | 84.5 | 4.25515 |
| R:prosper | 47.32 | 4.17204 |
| R:impacted | 70.57 | 3.64408 |
| R:grapple | 13.75 | 3.38906 |
| R:namely | 19 | 3.31465 |
| R:encompassing | 11 | 3.30112 |

FIG. 6

| Similarity Matrix | | | | | | | |
|---|---|---|---|---|---|---|---|
|  | $w_1$ | $w_2$ | $w_3$ | $w_4$ | $w_5$ | ... | $w_n$ |
| $w_1$ | --- | $s_{12}$ | $s_{13}$ | $s_{14}$ | $s_{15}$ |  | $s_{1n}$ |
| $w_2$ |  | --- | $s_{23}$ | $s_{24}$ | $s_{25}$ |  | $s_{2n}$ |
| $w_3$ |  |  | --- | $s_{34}$ | $s_{35}$ |  | $s_{3n}$ |
| $w_4$ |  |  |  | --- | $s_{45}$ |  | $s_{4n}$ |
| $w_5$ |  |  |  |  | --- |  | $s_{5n}$ |
| ... |  |  |  |  |  | --- | ... |
| $w_n$ |  |  |  |  |  |  | --- |

FIG. 7

SUGGESTING AND REFINING USER INPUT BASED ON ORIGINAL USER INPUT

BACKGROUND OF THE INVENTION

1. Field of the Invention

The present invention relates generally to generating alternative user inputs. More specifically, systems and methods to generate modified or refined user inputs based on an original user input, such as a search query, are disclosed.

2. Description of Related Art

Many users often modify or refine, sometimes repeatedly, their original search query during a given search session. For example, the user may modify an original search query to a more specific search query, a broader search query, and/or a search query using alternative query terms until desired search results are generated. User search query refinement occurs with queries in Roman-based languages, e.g., English, as well as with queries in non-Roman-based languages, e.g., Chinese, Japanese, Korean (CJK), Thai, etc. Users typically modify or refine their search queries when the original search query did not yield a good set of search results, e.g., if the search query is too specific or too broad or if the search query used improper terms. For example, the original user search query may yield too many irrelevant results when one or more of the search terms are ambiguous and some of the returned documents are related to a meaning of the ambiguous search term that is different from what the user intended and/or when the user is interested in only one aspect of a given search term among the many aspects of the search term. The original user search query may also yield too many irrelevant results when the user is merely exploring concepts related to a given search term.

Many search engines offer a list of suggested search queries related the user's original search query. For example, if a user's original search query is "Amazon," the search engine may suggest other related search queries such as "Amazon.com", "Amazon Rainforest", and "Amazon River." Search query suggestion may be particularly useful for non-Roman based language users such as CJK users. Specifically, non-Roman based language users may prefer clicking or selecting a suggested search query over typing modified search queries because non-Roman-based languages generally have a large set of characters and each character may require several keystrokes using a conventional Roman-based keyboard. For example, many Chinese language users use pinyin (phonetic spelling) to input Chinese characters. The conventional pinyin input system typically converts a pinyin input and provides a list of candidate Chinese character sets from which the user may select the intended set of Chinese characters. As is evident, the multi-step input process may be tedious and time-consuming.

Search query suggestion may also be useful for Roman-based language users. Many search engines, such as Yahoo, Teoma, Alta Vista, Askjeeves, AllTheWeb, and Baidu offer such as feature in the form of related search, query refinement, or query clustering.

SUMMARY OF THE INVENTION

Systems and methods to generate modified or refined user inputs based on an original user input, such as a search query, are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. The term computer generally refers to any device with computing power such as personal digital assistants (PDAs), cellular telephones, and network switches. Several inventive embodiments of the present invention are described below.

The method may be applied to queries in a non-Roman based language such as Chinese. The method may generally include receiving and identifying core terms in an original user input, determining potential alternative user inputs by replacing core term(s) in the original input with another term according to a similarity matrix and/or substituting a sequence of words in the original input with another sequence of words according to an expansion/contraction table, one sequence being a substring of the other sequence, computing likelihoods of the potential alternative user inputs, and selecting most likely alternative user inputs according to a predetermined criteria, e.g., the likelihood of each selected alternative user input is at least that of the original user input. The method may also include determining whether the original user input is in a pre-computed cache of suggested alternative user inputs and, if so, outputting pre-computed most likely alternative use inputs stored in the pre-computed cache.

The similarity matrix may be generated using a corpus and may have similarity values between two similar terms including phrasal terms such as "New York" and "Los Angeles" which may have a very high similarity although each pair of corresponding terms (New and Los and York and Angeles) does not have high similarity. In one embodiment, the similarity matrix can be generated by constructing feature vectors for words in the corpus and determining a similarity value between two words/phrases using their feature vectors.

The expansion/contraction table may be generated from a user input database and may have a frequency value associated with each pair of sequence of terms. In one embodiment, the expansion/contraction table may be generated by determining frequent word sequences, filtering out non-phrasal word sequences, and associating a count with each sequence of terms as the frequency value. Merely to illustrate, an example of an entry in the expansion/contraction table may be "The United States of America" and "United States."

The likelihoods of the potential alternative user inputs may be computed by determining at least one of: (a) a relevance between the original user input and the potential alternative user input, (b) a probability that the potential alternative user input will be selected by the user, and (c) a score of the position for the potential alternative user input. In particular, the relevance between the original user input and the potential alternative user input may be determined using correlation values between aligned terms of the original input and the potential alternative user input.

In another embodiment, a system for suggesting alternative user inputs generally includes a suggestion/refinement server configured to receive an original user input having at least one core term, to identify the core terms in the original user input, to determine potential alternative user inputs by performing at least one of (a) replacing at least one core term in the original user input with another term according to a similarity matrix, the similarity matrix having a similarity value between the two terms and (b) substituting a sequence of words in the original user input with another sequence of words according to an expansion/contraction table, one sequence being a substring of the other sequence, the expansion/contraction table having a frequency value associated with each sequence of terms, to compute likelihoods of the potential alternative user inputs, and to select and output most likely alternative user inputs according to a predetermined criteria.

In yet another embodiment, a computer program product for suggesting alternative user inputs is used in conjunction with a computer system, the computer program product including a computer readable storage medium on which are stored instructions executable on a computer processor. The instructions may generally include receiving and identifying core terms in an original user input, determining potential alternative user inputs by replacing core term(s) in the original input with another term according to a similarity matrix and/or substituting a sequence of words in the original input with another sequence of words according to an expansion/contraction table, one sequence being a substring of the other sequence, computing likelihoods of the potential alternative user inputs and optionally a predicted user satisfaction with the potential alternative user inputs, and selecting most likely alternative user inputs according to a predetermined criteria, e.g., the likelihood of each selected alternative user input is at least that of the original user input.

An application implementing the system and method may be implemented on a server site such as on a search engine or may be implemented, e.g., downloaded, on a client site such as a user's computer to provide suggested alternative inputs or to interface with a remote server such as a search engine.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

FIG. 5 is a table listing features and corresponding counts for the term "communities" generated from exemplary text.

FIG. 6 is a table listing exemplary features and corresponding counts for the term "communities" generated from a corpus.

FIG. 7 is an exemplary similarity matrix for use in replacing terms to generate suggested modified/refined queries.

DESCRIPTION OF SPECIFIC EMBODIMENTS

Systems and methods to generate modified or refined user inputs based on an original user input, such as a search query, are disclosed. It is noted that for purposes of clarity only, the examples presented herein are generally presented in terms of Chinese query inputs. However, the systems and methods for suggesting refined/modified user inputs may be similarly applicable for other non-Roman based languages such as Japanese, Korean, Thai, etc., as well as Roman-based languages. In addition, the systems and methods for suggesting refined/modified user inputs may be similarly applicable for other non-query user inputs. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

The systems and methods to generate modified or refined user inputs based on the original user input, such as a query, based on the user's query history and relationships between the terms of the user query. The systems and methods may include systems and methods for extracting new terms including new name entities (e.g., proper names, names of movies, songs and products, etc.) and the relationships between terms. The systems and methods described herein are suitable for use in generating query (or other user input) refinement but may also be adapted for many other applications such as news article classification, spelling correction, media search and segmentation. For many user, the initial search query is often not the best search query and the user thus modifies or refines the search query, sometimes multiple times, during a given search session.

Figure 1A:
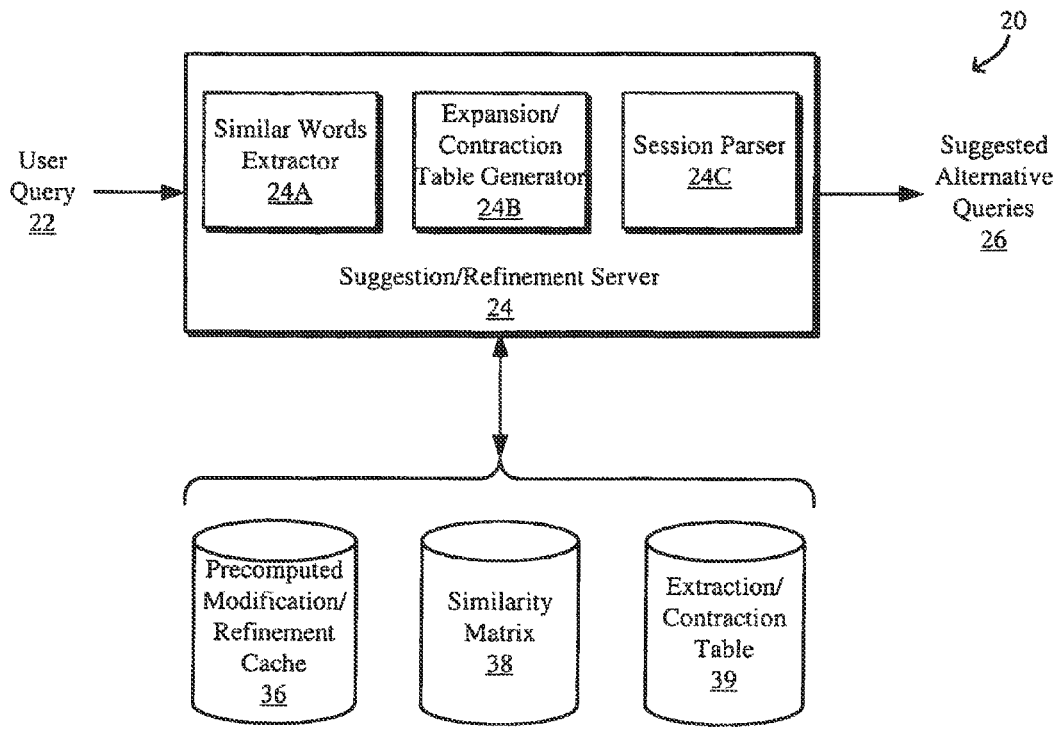
FIG. 1A is a block diagram of an exemplary system for generating suggested modified/refined user inputs such as user search queries.

FIG. 1A is a block diagram of an exemplary system 20 for generating suggested modified/refined inputs 26 from an original user input such as a user search query 22. The system 20 generally includes a suggestion/refinement server 24 that generates suggested modified/refined queries 26 using probabilities that may be derived from the various data sources. Examples of the various data sources include an optional suggestion/refinement cache 36 that stores a cache of pre-computed query suggestions or refinements. The suggestion/refinement cache 36 may be initially generated by a session parser 24C of the suggestion/refinement server 24. Another data source may be a similarity matrix 38 that may be generated by a similar words extractor 24A of the suggestion/refinement server 24 and an expansion/contraction table 39 that may be generated by an expansion/contraction table generator 24B. The similarity matrix 38 and the expansion/contraction table 39 generally approximate relationships between the terms and/or sequence of terms. The system 20 may periodically update and/or regenerate the similarity matrix 38 and/or the expansion/contraction table 39. The similar words extractor 24A, expansion/contraction table generator 24B, and session parser 24C of the suggestion/refinement server 24 will be described in more detail below with reference to FIGS. 1B-1D, respectively.

Figure 1B:
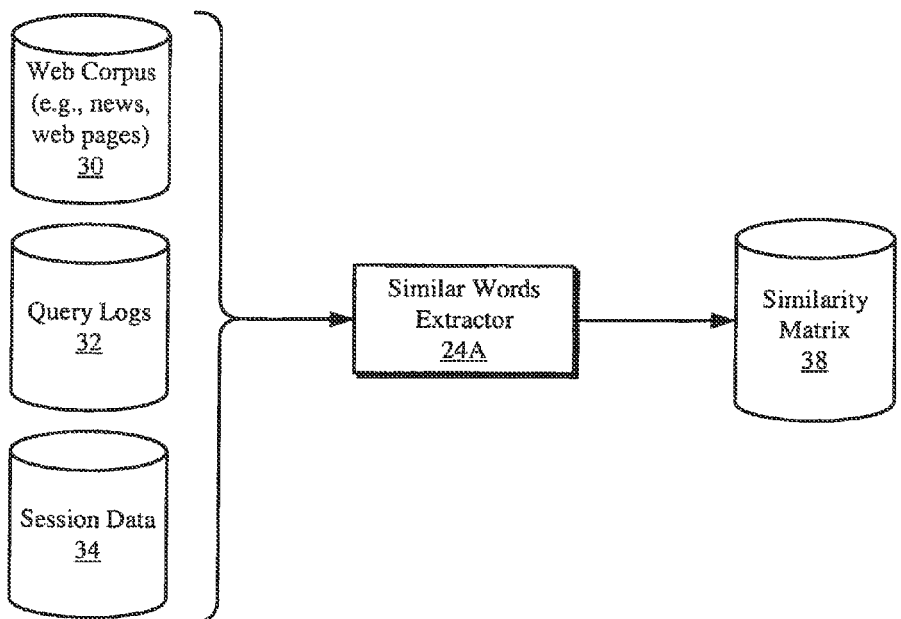
FIG. 1B is a block diagram illustrating a process for generating a similarity matrix by a similar words extractor of the suggestion-refinement server.

FIG. 1B is a block diagram illustrating a process for generating the similarity matrix 38 by the similar words extractor 24A. As shown, the similar words extractor 24A may utilize various data sources for generating the similarity matrix 38. Examples of the data sources utilized by the similar words extractor 24A include a corpus such as a web corpus 30 (e.g., news, web pages, and anchor text information), queries and associated user selections such as those stored in the query logs 32, and/or session data 34 that may include the history of queries in each given session. The web corpus 30 may also include anchor text information. The query logs 32 may include not only a log of user queries but also the search result selections made by the user as well as the duration that the user stayed at the selected search result before returning to the search results, for example.

Figure 1C:
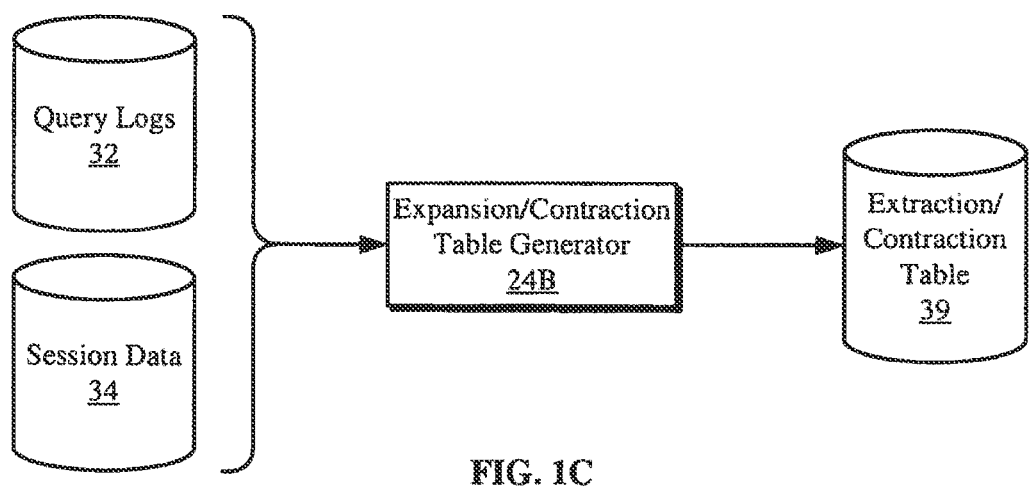
FIG. 1C is a block diagram illustrating a process for generating an extraction/contraction table by an expansion/contraction table generator of the suggestion-refinement server.
Figure 1D:
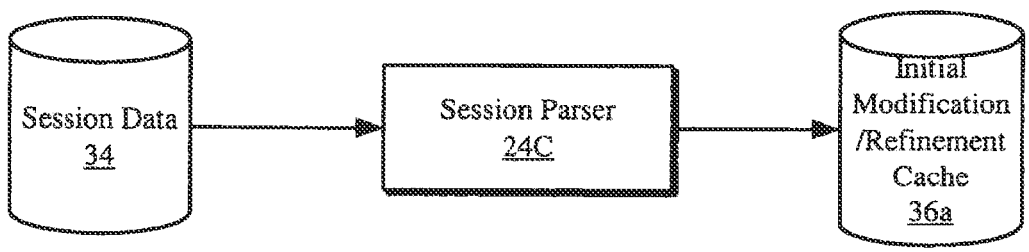
FIG. 1D is a block diagram illustrating a process for generating an initial modification/refinement cache by a session parser of the suggestion-refinement server.

FIG. 1C is a block diagram illustrating a process for generating the extraction/contraction table 39 by the expansion/contraction table generator 24B. As shown, the expansion/contraction table generator 24B may utilize query logs 32 and/or session data 34 as data sources for generating the extraction/contraction table 39. FIG. 1D is a block diagram illustrating a process for generating an initial modification/refinement cache 36a by the session parser 24C. As shown, the session parser 24C may utilize session data 34 as its data source for generating the initial modification/refinement cache 36a.

Figure 2A:
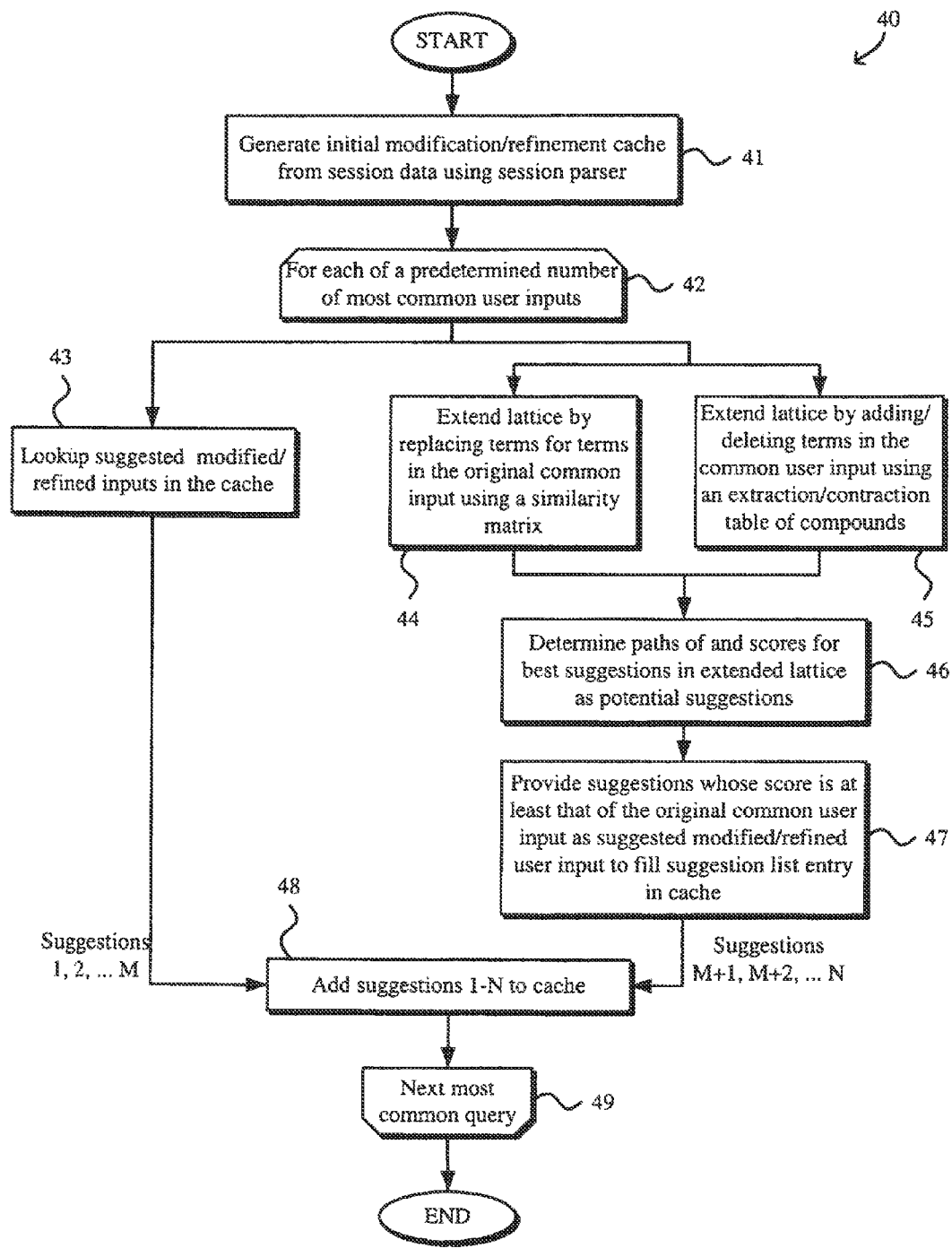
FIG. 2A is flow chart illustrating an exemplary process for generating a modification/refinement user inputs cache as may be implemented by the system shown in FIG. 1A.
Figure 2B:
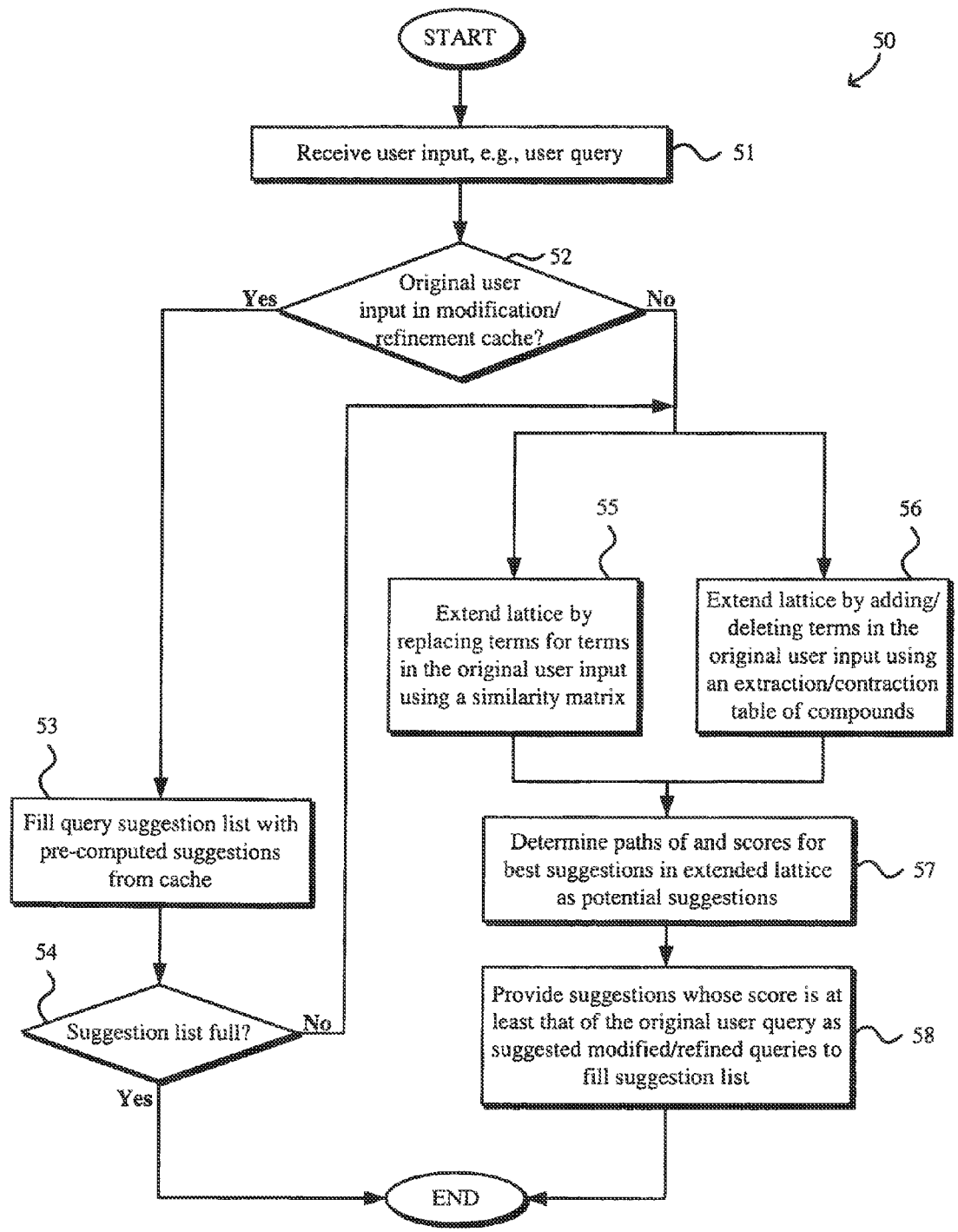
FIG. 2B is a flow chart illustrating an exemplary process for generating suggested modified/refined user inputs such as user queries as may be implemented by the system shown in FIG. 1A.

FIGS. 2A and 2B are flowcharts illustrating exemplary processes that may be performed by the suggestion/refinement server 24. In particular, FIG. 2A is flow chart illustrating an exemplary process 40 for generating a modification/refinement user inputs cache as may be implemented by the system 20 shown in FIG. 1A. At block 41, an initial modification/refinement cache can be generated from session data using a session parser. As noted, session data may include the history of queries in each given user input or query session. The process 40 then enters a loop that includes blocks 43-48 for each of a predetermined number of most common user input, e.g., queries, at block 42. In particular, at block 43, the process performs a lookup of suggested modified/refined queries in the cache. The lookup at block 43 may result in suggestions 1, 2, . . . M.

Each user input or query entry in the modification/refinement cache may contain a list of predetermined number N of suggested queries. Thus, to generate suggestions M+1, M+2 . . . N, i.e., to fill up the suggested queries list for each query, blocks 44-47 may also be performed. In particular, at blocks 44 and 45, an extended query lattice may be (conceptually) built to generate additional suggested modified/refined (alternative) queries. Block 44 generally represents a term replacement query modification/refinement method while block 45 generally represents an expansion/contraction query modification/refinement method. Specifically, at block 44, the extended query lattice may be built by replacing terms in the original query with similar terms using a similarity matrix of similar terms. Term replacement replaces a word or term (including phrasal term) in the original query with a similar word or term. Similar terms may include synonyms or near synonyms (e.g., community and neighborhood), acronyms, and/or terms in the same syntactic/semantic category (e.g., Toyota and Honda, Dell and HP, DVD and digital camera, and Nokia and Motorola).

At block 45, the extended query lattice may additionally and/or alternatively be built by adding/deleting terms in the original query using an expansion/contraction table of pairs of compounds. In particular, each entry in the expansion/contraction table is a pair of compounds where one compound is a substring of another, e.g., $T_1T_2 \Longleftrightarrow T_1T_2T_3$, and $T_4T_5T_6 \Longleftrightarrow T_4T_5$. Examples of Chinese compound pairs include Shanghai and Shanghai City as well as television and television set. Compound pairs may include ambiguous terms and their unambiguous context (e.g., Amazon and Amazon rain forest and/or Amazon.com), concepts and their refinement (e.g., cell and stem cell and/or cell phone), terms and their attributes (e.g., computer and memory, hard disk drive, and/or DVD drive), and names (e.g., names of people, companies, and the like) and their corresponding activities, job, products, etc. (e.g., actor-movie such as Tom Hanks and Forrest Gump, company-product such as Apple and iPod, person-company or title Bill Gates and Microsoft or CEO, author-book, singer-song, etc.).

After the extended query lattice is built to contain various alternative paths, the paths and scores for a predetermined number of best queries in the extended query lattice are identified as potential suggested queries at block 46. At block 47, the score of the original common user query is computed so that only the potential suggested queries whose score is at least that of the original common user query are provided as the suggested modified/refined queries. The score may represent the likelihood of the given query (original or potential suggested query) being the query selected or intended by a user. The queries whose score is at least that of the original common user query can be provided as suggested modified/refined queries to fill the suggestion list entry in the modification/refinement cache. The resulting suggested queries may be stored to the pre-computed modified/refined queries cache. Note that the process 40 or the loop includes blocks 42-49 may be repeated periodically to update the modification/refinement cache.

FIG. 2B is a flow chart illustrating an exemplary process 50 for generating suggested modified/refined user inputs such as user queries as may be implemented by the system 20 shown in FIG. 1A. At block 51, a user input such as a user query is received. At decision block 52, the original user input received at block 51 may be compared to entries in the optional pre-computed modification/refinement cache. If the original user query is determined to be in the suggestion/refinement cache at decision block 52, then a query suggestion list of size N is at least partially filled with up to N pre-computed query suggestions from the pre-computed modification/refinement cache at block 53. If the suggestion list is full as determined at decision block 54, the process 50 is complete. Note that the suggestion list may be of a predefined size N, e.g., 10 suggestions or a single best suggestion. Alternatively, if the suggestion list is not full as determined at decision block 54, then the process 50 continues at blocks 55 and 56. Similarly, if the original user query is determined not to be in the suggestion/refinement cache at decision block 52, the process also continues at blocks 55 and 56. Note that blocks 55-58 are similar to blocks 44-47 of process 40 as described above with reference to FIG. 2A.

Accordingly, the descriptions, to the extent they are similar, are not repeated here for purposes of clarity.

At blocks 55 and 56, an extended query lattice is (conceptually) built to generate suggested modified/refined (alternative) queries. After the extended query lattice is built to contain various alternative paths, the paths and scores for a predetermined number of best queries in the extended query lattice are identified as potential suggested queries at block 57. At block 58, the score of the original user query is computed so that only the potential suggested queries whose scores are at least that of the original user query are provided as the suggested modified/refined queries. The queries whose score is at least that of the original user query can be provided to the user as suggested modified/refined queries to fill the suggestion list or the remainder of the suggestion list. Although not shown, a single best query may alternatively be provided. In addition, the original user query and the resulting suggested queries may be additionally stored to the pre-computed modified/refined queries cache.

The various blocks of the processes 40 and 50 as shown and described above with reference to FIGS. 2A and 2B for generating suggested modified/refined user inputs will be described in further detail below.

Figure 3:
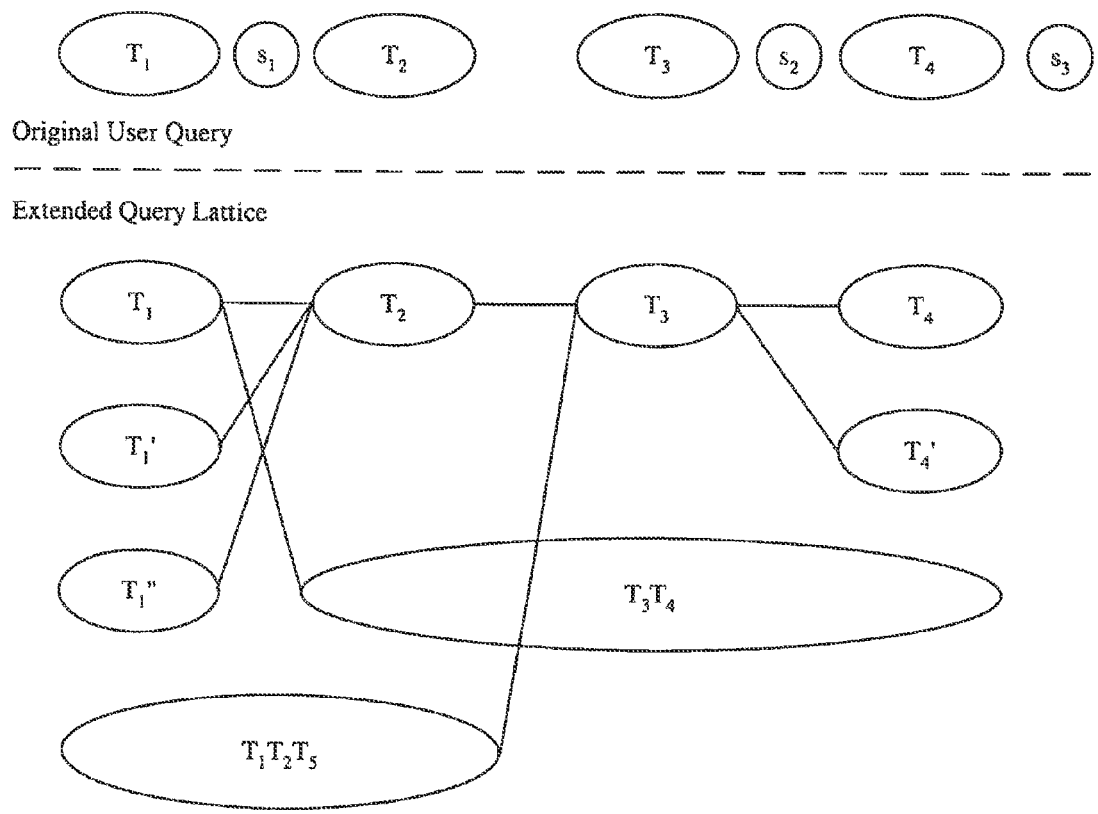
FIG. 3 illustrates an exemplary query lattice diagram generated by parsing an original user query.

FIG. 3 illustrates an exemplary extended query lattice diagram. As shown, the original query may include various core words or terms $T_1, T_2, T_3, T_4$ and non-core words or terms $s_1, s_2, s_3$. For example, in a Chinese query "URL's of sina", the core term or entity is "sina" rather than "URL's." Non-core terms generally also include stop words. A non-stop word is generally defined as, for example, the 30 most frequently occurring Chinese words or the 100 most frequently occurring English words in the corpus such as a web corpus.

After the core entities of the original query are identified, one or more query modification or refinement methods, e.g., term replacement and/or expansion/contraction, can be applied to build the extended query lattice. As noted above, term replacement refers to the replacement of words and/or terms that are similar (e.g., synonym or a near synonym) to the core entities and that may be identified using, for example, the similarity matrix. Merely for illustrative purposes, FIG. 3 illustrates that the extended query lattice may be built by replacing the term $T_1$ with $T_1'$ or $T_1''$ and/or by replacing the term $T_4$ with $T_4'$.

As also noted above, expansion/contraction refers to the adding core entities to and/or deleting some of the core entities from in the original query using, for example, the expansion/contraction table of compounds. Merely for illustrative purposes, the expansion/contraction table of compounds may include a table entry for the pair of compounds $T_1T_2$ and $T_1T_2T_5$ such that the compound $T_1T_2$ in the original query in FIG. 3 may be replaced with the compound $T_1T_2T_5$ (i.e., adding a new term $T_5$) so as to further build on the extended query lattice. Similarly, the expansion/contraction table of compounds may also include a table entry for the pair of compounds $T_2T_3T_4$ and $T_3T_4$ such that the compound $T_2T_3T_4$ in the original query in FIG. 3 may be replaced with the compound $T_3T_4$ (i.e., deleting core entity $T_2$) so as to further build on the extended query lattice.

Figure 4:
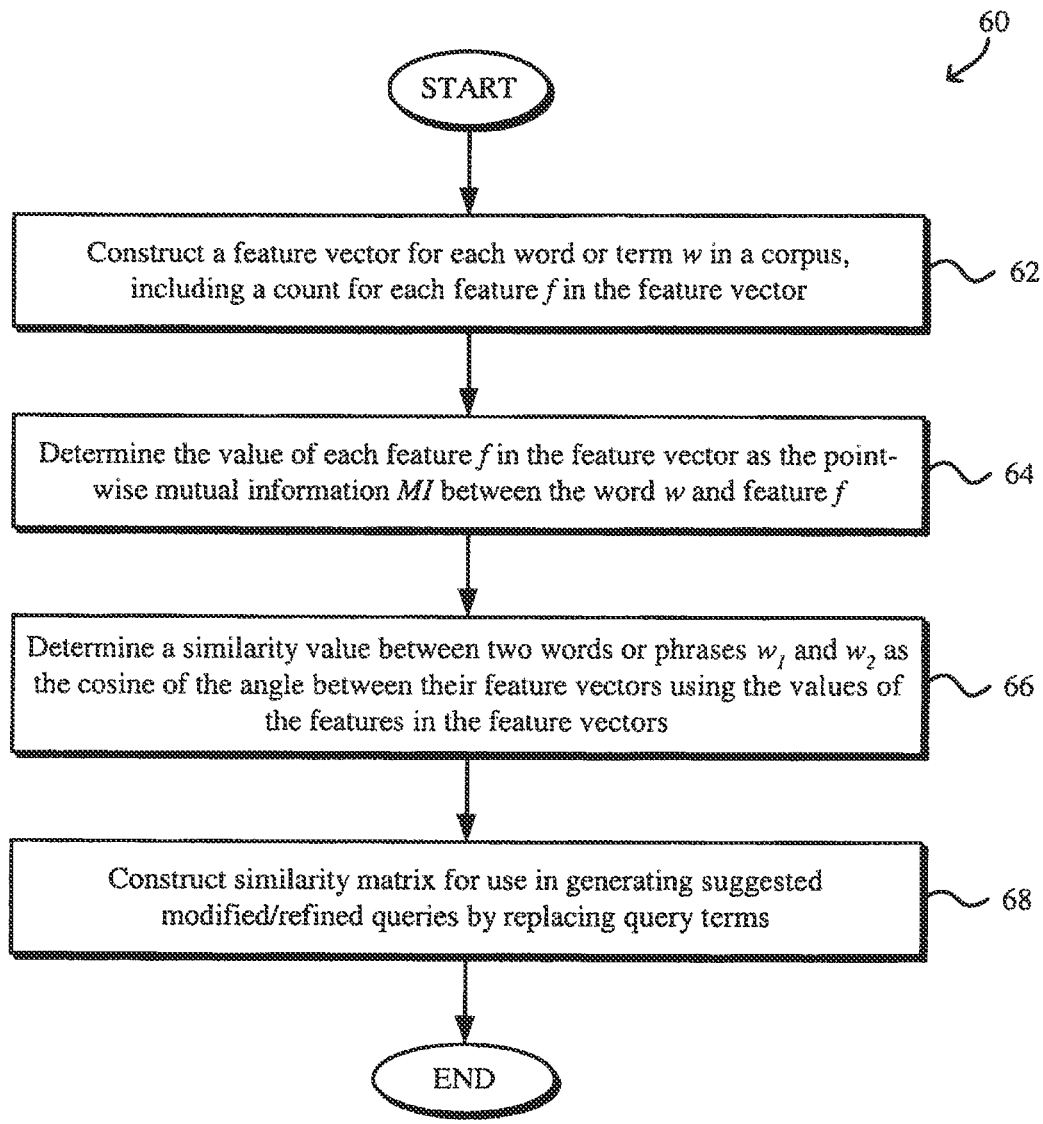
FIG. 4 is a flowchart illustrating an exemplary process for constructing a similarity matrix for use in generating suggested modified/refined queries by replacement of query terms.

One exemplary method for generating the similarity matrix of similar terms is described in more detail with reference to FIGS. 4-7. FIG. 4 is a flowchart illustrating an exemplary process 60 for constructing the similarity matrix for use in generating suggested modified/refined queries by replacement of query terms. The similarity matrix can be a matrix of distributional word similarities between each pair of words or terms w. The distributional word similarities for each word w may be obtained by constructing a feature vector for each word w in a corpus, e.g., web pages, and determining the similarity between each pair of words as the cosine of the angle between their respective feature vectors. The feature vector of a word or term may include the surrounding words at all occurrences of the word or term.

One example of the construction of feature vectors and the similarity matrix is presented with reference to FIG. 4 although various other feature vector and similarity matrix construction methods may be similarly employed. In particular, at block 62, a feature vector for each word/term w in a corpus, such as a web corpus, along with a count for each feature f in the feature vector is constructed. The features of a word/term w may include words occurring before and after the word/term w, up to the first non-stop word. Merely for illustrative purposes, given the sentence "Because communities assess at different percentages of fair market value, the only way to compare tax rates among communities is by using equalized rates," the features of the word communities and their corresponding co-occurrence counts are listed in the table of FIG. 5. Note that in a language having different forms of a given word, e.g., singular and plural such as "community" and "communities" or different tenses such as "walk," "walking", and "walked", the system may treat the different forms of the word as separate words but are generally similar terms. Such treatment of different forms of a given word may not be relevant for languages that do not have such differentiations such as is typically the case in, for example, Chinese. In addition, also note that a feature with prefix "L:" or "R:" is a word that appears on the left or right of the word w, respectively. In this embodiment, the sum of the counts of the one or more features on each left and right side of a given instance of the word w is 1. For example, in the first instance of the word "communities," each of the left and right features is assigned a count of 1. In addition, when there are one or more stop words adjacent to the word "communities," e.g., "between," "is," and "by," the counts of the features for each side of the given instance of the word "communities" can be equally divided and thus computed as a fraction. In the second instance of the word "communities," there are two left features such that each left feature is assigned a count of 0.5. Similarly, in the second instance of the word "communities," there are two right features such that each right feature is assigned a count of 0.33.

Referring again to FIG. 4, at block 64, the value of the each feature f in the feature vector may be determined as the point-wise mutual information MI between the word w and feature f. The value of the point-wise mutual information MI is used because, while words that occur frequently, e.g., stop words, tend to have higher counts, such words are often semantically vacuous. Accordingly, as the counts of the features may not be good indicators of the importance of the features, the point-wise mutual information MI(w, f) between a word w and a feature f may be used as the value of the feature f. The point-wise mutual information MI(w, f) may be defined as the logarithm of the ratio between the observed joint probability of w and f, P(w, f), and the expected probability of w, P(w), and the expected probability of f, P(f), co-occurring if they were independent:

$$MI(w, f) = P(w \cdot f) \cdot \log \frac{P(w \cdot f)}{P(w) \cdot P(f)}$$

where the probabilities (e.g., relative frequencies) of the features P(f) and words P(w) may be determined using, for example, their respective probabilities in the corpus. Merely as an example, FIG. 6 is a table listing exemplary features and corresponding probabilities for the term "communities" generated from a web corpus. The feature vector table shown in FIG. 6 lists a subset of the features of the word "communities" as well as the probabilities and the mutual information between the features and the word "communities." Note that feature vectors can be fairly large. For example, the full set of the features of the word communities extracted from the corpus includes approximately 2,000 elements.

Referring once again to FIG. 4, at block 66, a similarity measure or value sim between two words or phrases $w_1$ and $w_2$ may be determined as the cosine of the angle between their feature vectors using the values of the features in the feature vectors. In particular, the similarity sim between two terms or words $w_1$ and $w_2$ can be defined as:

$$sim(w_1, w_2) = \frac{\sum_i f_{11} \cdot f_{21}}{\sqrt{\sum_i f_{11}^2} \sqrt{\sum_i f_{21}^2}}$$

where the feature vectors of $w_1$ and $w_2$ are represented by ($f_{11}$, $f_{12} \ldots, f_{1n}$) and ($f_{21}$, $f_{22} \ldots, f_{2n}$), respectively.

At block 68, the similarity matrix is then constructed from the similarity values for each pair of words for terms and may be used in generating suggested modified/refined queries by replacing query terms with similar terms. In particular, the similarity values may be used in determining the scores for a potential suggest query, for example. Note that the similarity matrix may be recomputed periodically and/or the similarity value for terms, such as those for newly identified terms, may be added to the matrix. FIG. 7 is an exemplary similarity matrix that may be employed in replacing similar terms to generate suggested modified/refined queries.

Figure 8:
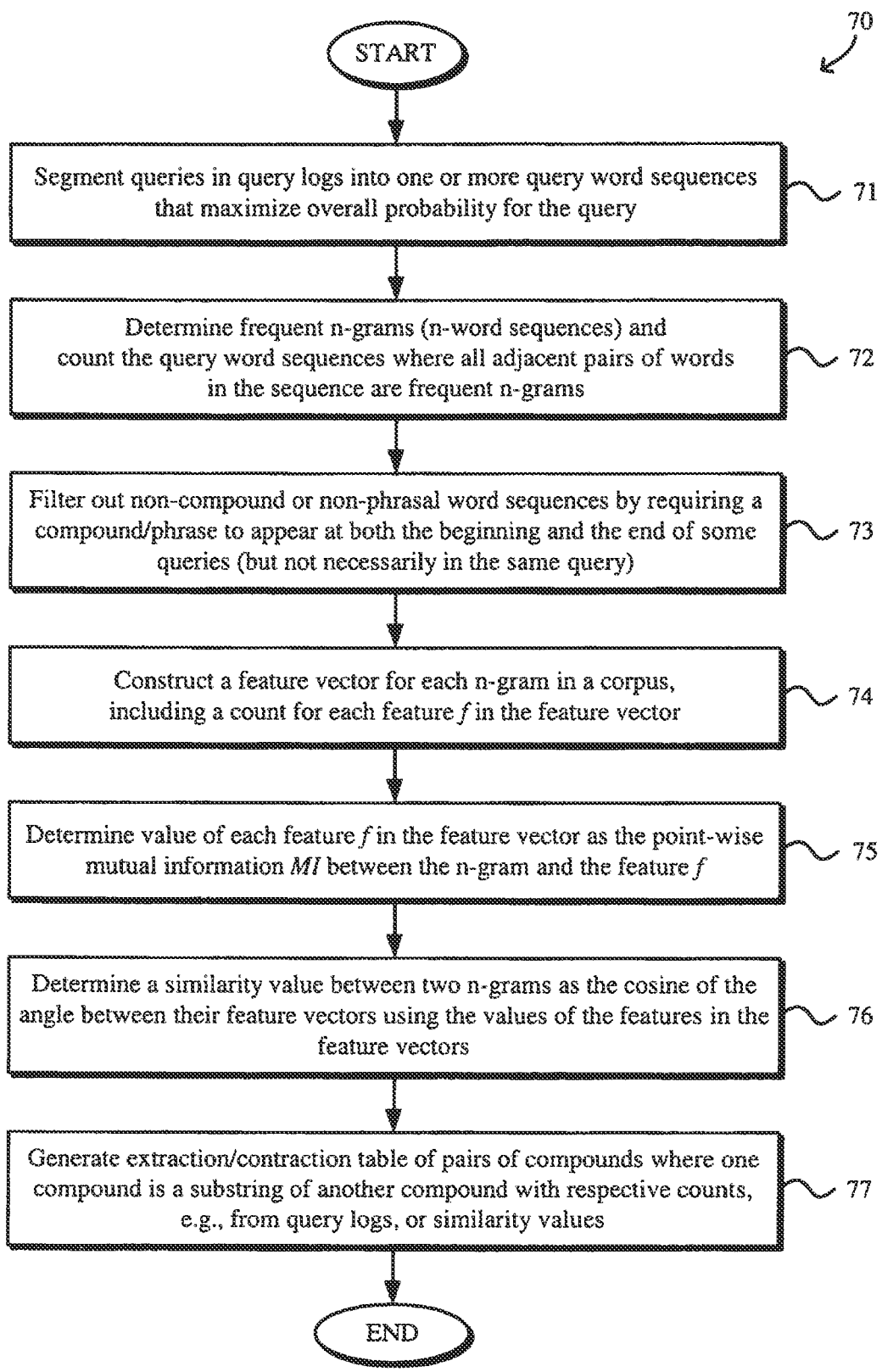
FIG. 8 is a flowchart illustrating an exemplary process for constructing an extracting/contraction table of pairs of compounds for use in generating suggested modified/refined queries by substituting compounds in queries.

An exemplary method for generating the similarity matrix for use in applying the term replacement query modification/refinement method having been presented, an exemplary method for generating the expansion/contraction table of pairs of compounds for use in applying the expansion/contraction query modification/refinement method will now be described in more detail below with reference to FIGS. 8-11. FIG. 8 is a flowchart illustrating an exemplary process 70 for constructing the extracting/contraction table of pairs of compounds. As noted above, each entry in the expansion/contraction table is a pair of compounds where one compound is a substring of another such that if a query contains a compound that is one of the pair of compounds in an entry in the expansion/contraction table, the compound may be substituted by the other compound in the compound pair entry in extending the lattice. Ideally, each compound in the extracting/contraction table should be a meaningful phrase. Merely as examples, a compound pair may be Shanghai and Shanghai City or television and television set. As noted above, compound pairs may include, for example, ambiguous terms and their unambiguous context (e.g., Amazon and Amazon rain forest), names of people and their corresponding activities, attributes of terms, refinement of concepts, actors, authors, products, person-position, etc.

At block 71, queries in query logs (or another database of user inputs) may be segmented into a word sequence that maximizes the overall probability for the query. In particular, because Chinese words need not be explicitly delineated with spaces or other breaks such that a query may be a string of Chinese characters without breaks, a segmentor may be employed to segment a sequence of characters into a sequence of words. The sequence of words can be such that the product of the probabilities of the words is the maximum among all possible segmentations of the sequence of characters. As is evident, block 71 need not be performed for certain languages such as English where there are clear delineations between adjacent words.

To identify compounds/phrases, frequent word sequences or n-grams (sequence of n sequences) are identified at block 72. Also at block 72, a count of the word sequences where all adjacent pairs of words in the word sequence are frequent n-grams is made so as to identify frequent word sequences of any length. Note that frequent word sequences may or may not be compounds. For example, some of the frequent word sequences may be compounds while others may be non-phrasal or non-compound sequences.

At block 73, non-phrasal sequences are identified by requiring a compound/phrase to appear at the beginning as well as the end of a minimum number of a queries (but not necessarily in the same query). The minimum number of queries may be any number greater than or equal to 1 but is typically much greater than 1, e.g., 50 or 100.

At block 74, a feature vector for each n-gram in a corpus, such as a web corpus, along with a count for each feature fin the feature vector is constructed. At block. 75, the value of the each feature f in the feature vector may be determined as the point-wise mutual information MI between the n-gram and feature f. At block 76, a similarity measure or value sim between two n-grams may be determined as the cosine of the angle between their feature vectors using the values of the features in the feature vectors. Note that blocks 74, 75, and 76 are similar to blocks 62, 64, and 66 of process 60, respectively, as described above with reference to FIG. 4. Accordingly, the descriptions, to the extent they are similar, are not repeated here for purposes of clarity.

The expansion/contraction table may then be constructed as pairs of compounds where one compound is a substring of another at block 77. In addition, the counts of the compounds can also be determined and stored in the expansion/contraction table.

Figures 9, 10:
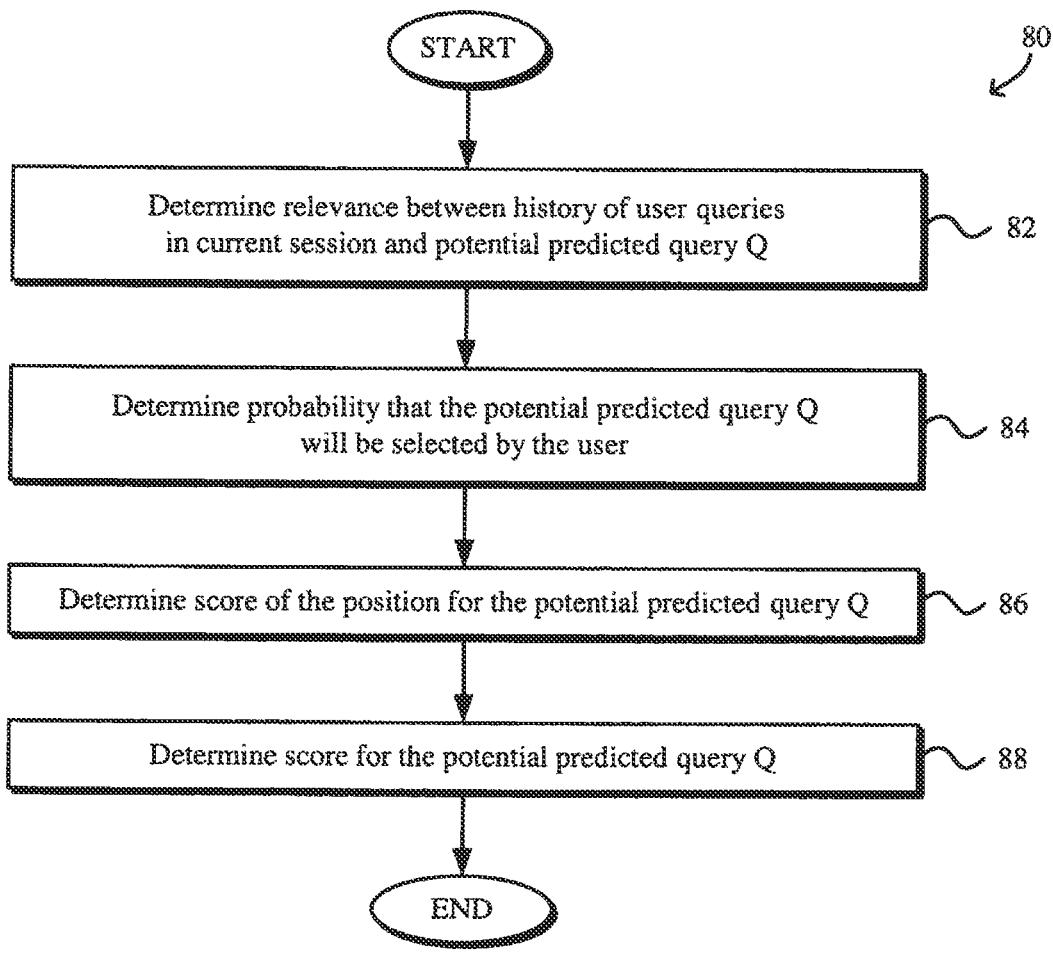
FIG. 9 is table illustrating some exemplary entries in an expansion/contraction table for use in substituting compounds in queries to generate suggested modified/refined queries.
FIG. 10 is a flowchart illustrating an exemplary process for determining the score of a suggested modified/refined query.

FIG. 9 is table illustrating some exemplary entries in an expansion/contraction table for use in substituting compounds in queries to generate suggested modified/refined queries. As shown, each row of the expansion/contraction table contains two compounds or word sequences in which one compound is a substring of the other. Each compound is also associated with a count (or other frequency value) which may be determined from the query log or some other user input database, for example. The count may be used as a cut-off to decrease the size of the database and/or may be used, at least in part, to determine a weight for a term or a compound, e.g., by using log(count). As described above with reference to FIGS. 2A and 2B, once the query lattice is extended by replacing terms and/or by adding/deleting terms in the original query, the paths and scores of the N best queries are determined from the extended lattice as potential suggested queries. FIG. 10 is a flowchart illustrating an exemplary process 80 for determining the score of a suggested modified/refined query, e.g., a path in the extended query lattice.

The determination of query suggestions can be treated as a prediction problem based on previous queries in the current query session. Given the history of queries $Q_1, Q_2, \ldots, Q_{n-1}$ in the current search session, a prediction may be made as to what the next query $Q_n$ the user is most likely to select. The suggested or predicted next query Q, should not only be relevant to the history of queries $Q_1, Q_2, \ldots, Q_{n-1}$ in the current session but also yield good search results. A measurement of how good the search results are may be a function of, for example, click position (the position of the search result that the user selects) and click duration (how long the user stays at the selected search result page).

In one embodiment, the score for each potential suggested query can be determined as the value of the object function F:

$$F(Q, Q_1, \ldots, Q_{n-1}) = \text{Rel}(Q, Q_1, \ldots, Q_{n-1}) * \text{Click}(Q) * \text{Position}(Q);$$

where:

Rel(Q, $Q_1, \ldots, Q_{n-1}$) is the relevance between the history of queries $Q_1, \ldots, Q_{n-1}$ and the candidate suggested query Q;

Click(Q) is the probability that the candidate suggested query Q will be selected by the user; and Position(Q) is the position of the search result for the candidate suggested query Q that will be clicked.

As described above with reference to FIG. 2, one or more suggested or predicted next query Q can be provided to the user. Thus, the best N suggest next queries (e.g., paths in the extended query lattice) are the N queries with the highest object function values and the best (e.g., most likely) suggested next query can be expressed as the query that maximizes the value of the object function F:

$$Q_n = \text{ArgMax}\_Q\{F(Q, Q_1, \ldots, Q_{n-1})\}$$

Figure 11:
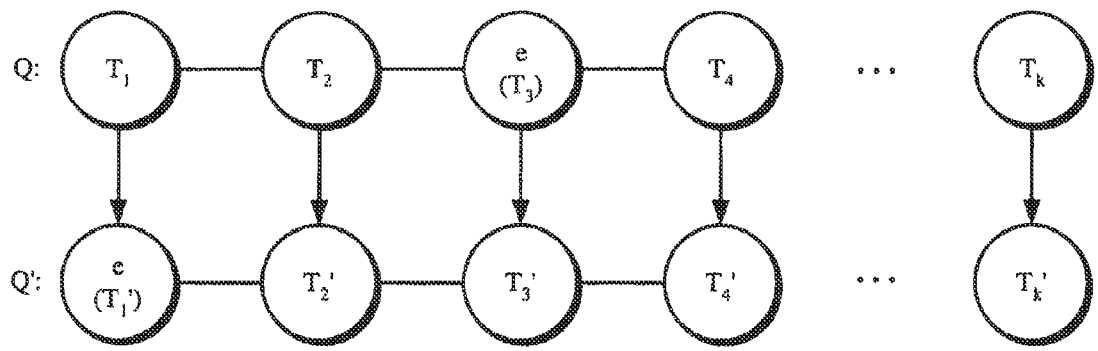
FIG. 11 illustrates an example of an alignment mapping of terms two queries Q and Q'.

The determination of the scores for each potential suggested or predicted next query Q 90 is shown in the flowchart of FIG. 10. At block 82, the relevance Rel(Q, $Q_1, \ldots, Q_{n-1}$) between the history of user queries, $Q_1, \ldots, Q_{n-1}$ in the current session and a predicted query Q is determined using correlations of aligned terms in the queries. In particular, to estimate the relevance function Rel, the terms or core entities in the original query Q are identified. Using the correlations between core entities, the relevance Rel(Q, Q') between two queries Q and Q' can be derived from the correlation of their core entities. In particular, the relevance Rel(Q, Q') can be expressed as:

$$\text{Rel}(Q, Q') = \text{Max}\_f \text{Prod}\_\{i=1\}^k \text{Cor}(T_i, T_i') * w(T_i)$$

where:

alignment function $f = f(T_1, T_2, \ldots, T_k, T_1', T_2', \ldots, T_k')$ maps the terms of the related queries Q and Q', e.g., a mapping between $\{T_1, \ldots, T_k, e\}$ and $(T_1', \ldots, T_k', e)$, an example of which is shown in FIG. 11;

Cor($T_i, T_i'$) is the correlation between terms $T_i, T_i'$ and is a vector of real numbers;

Q = $T_1, T_2, \ldots, T_k$ (core entities in query Q in which any term $T_i$ may be an empty term e);

Q' = $T_1', T_2', \ldots, T_k'$ (core entities in query Q' in which any term $T_i'$ may be an empty term e); and w($T_i$) is the importance of term $T_i$, e.g., TF/IDF for $T_i$, where TF represents a term frequency (e.g., count of the term) and IDF represents an inverted document frequency.

Next, at block 84, the probability that query Q will be selected by the user, Click(Q), is determined from, for example, click duration or normalized click duration. At block 86, the score of the position for the predicted query Q, Position(Q), is determined from, for example, the click position, normalized click position, or inverted click position. Lastly, at block 88, the value of the object function F for the potential suggested or predicted next query Q is determined from the results of blocks 82, 84, and 86 as described above.

Figure 12:
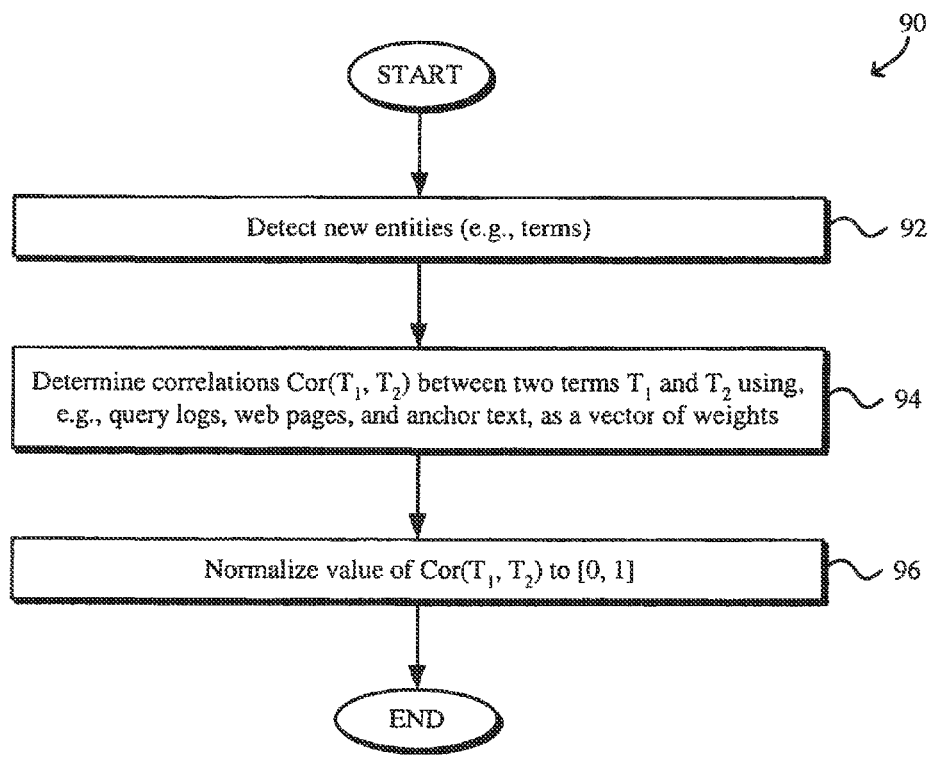
FIG. 12 is a flowchart illustrating an exemplary process for generating correlation values for detected new entities.

The determination of correlation values Cor($T_i, T_i'$) used in determining the relevance between two queries is described in more detail with reference to FIG. 12. In particular, FIG. 12 is a flowchart illustrating an exemplary process 90 for generating correlation values between pairs of terms or core entities T, T'. At block 92, new core entities may be identified from a corpus, e.g., web pages and user queries, using mutual information. In one illustrative implementation of block 92, if Motorola is an entity and "Motorola announced," "Motorola cell phone," and "buy Motorola" as well as "Nokia announced," "Nokia cell phone," and "buy Nokia" are in the corpus, then Nokia is also identified as an entity. It is noted that although off-the-shelf dictionaries can provide the conventional core entities, many new core entities are often introduced into the vocabulary. Example of new core entities include proper names, e.g., people and company names, and various other new words and phrases such as product models, movies and song titles etc.

At block 94, the correlation values between pairs of core entities T, T' can be determined using, for example, query logs, web pages and anchor text. The correlation between two core entities $T_1$ and $T_2$ may be defined as a function of a vector of real numbers:

$$\text{Cor}(T_1, T_2) = f(w_1, w_2, \ldots, w_n)$$

where $w_1, w_2, \ldots, w_n$ are the weights of certain predetermined relationships. Examples of the predetermined relationships include (1) synonyms, acronyms and antonyms, (2) compounded phrase such as Shanghai vs. Shanghai City, television vs. television machine, (3) terms in the same syntactic/semantic category, e.g., Toyota and Honda, (4) ambiguous terms and their unambiguous context, (5) names of people and their corresponding activities, e.g., Oprah and talk show host, (6) attributes of terms, e.g., computer and memory, (7) refinement of concepts, e.g., Amazon and Amazon River, Amazon Rain Forrest, and Amazon.com, (8) movie-actors, book-authors, company-product, person-position, etc., e.g., Tom Hanks and Forrest Gump and Bill Gates and CEO.

At block 96, the value of the correlation vectors Cor($T_1, T_2$) may be normalized to [0-1].

The systems and methods for generating modified or refined user inputs can suggest queries that a user is likely to use and/or that generate a top result that the user is likely to select. The systems and methods quantitatively measure the correlation between two queries. As is evident, the two queries need not have any common terms or even synonyms. For example, the queries related to an original query (e.g., in Chinese) "'Now and Forever' mp3" for the mp3 file of the song "Now and Forever," may include "CoCo Lee" (singer of the song), as well as other songs or albums by the same artist, for example. Thus the suggested queries may not be simply an expansion of the original query but rather queries with better search results, e.g., search results that the users are more likely to select. In one example, the suggested queries may include queries that achieve query sense disambiguation where the original query is short and ambiguous. As another example, the suggested queries may include queries that split the original query into shorter queries where the original query may be long and/or contain mutually exclusive terms.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A computer-implemented method comprising:
   receiving a first search query from a user associated with a user device;

obtaining a plurality of queries received from the user in a current query session, the plurality of queries including the first search query and one or more queries received from the user before the first search query;

generating a plurality of query suggestions for the first search query including replacing one or more first terms occurring in the first search query with one or more second terms;

computing a respective relevance score between the plurality of queries received from the user in the current query session and each query suggestion of the plurality of query suggestions;

computing for each of the plurality of query suggestions a respective position of a selected search result that was previously provided in response to receiving the query suggestion as a search query;

computing a respective ranking score for each of the plurality of query suggestions based on the respective relevance score for each of the plurality of query suggestions and the respective position of the selected search result that was previously provided in response to receiving the query suggestion as a search query;

ranking the plurality of query suggestions according to the computed ranking score for each of the plurality of query suggestions; and providing one or more highest-ranked query suggestions to the user in response to receiving the first search query.

2. The method of claim 1, wherein the plurality of queries received from the user in the current query session are user refinements of an original search query.

3. The method of claim 1, further comprising:
computing for each of the plurality of query suggestions a respective likelihood that the query suggestion will be selected by the user, wherein computing the ranking score for the query suggestion comprises computing the ranking score based on the likelihood that the query suggestion will be selected by the user.

4. The method of claim 1, wherein computing the respective relevance score between the plurality of queries received from the user in the current query session and each query suggestion of the plurality of query suggestions comprises:
computing a correlation score between core terms in the first query and one or more core terms in each of the plurality of queries received from the user in the current query session.

5. The method of claim 4, further comprising determining aligned terms between the core terms in the first query and the one or more core terms in each of the plurality of queries received from the user in the current query session.

6. The method of claim 5, wherein a correlation score between aligned terms is based on a function of a plurality of weights, each weight corresponding to a respective relationship between the aligned terms, wherein the relationships between the aligned terms include one or more of a synonym relationship, an acronym relationship, an antonym relationship, a compound phrase relationship, or a same category relationship.

7. A system comprising:
one or more computers and one or more storage devices storing instructions that are operable, when executed by the one or more computers, to cause the one or more computers to perform operations comprising:
receiving a first search query from a user associated with a user device;
obtaining a plurality of queries received from the user in a current query session, the plurality of queries including the first search query and one or more queries received from the user before the first search query;

generating a plurality of query suggestions for the first search query including replacing one or more first terms occurring in the first search query with one or more second terms;

computing a respective relevance score between the plurality of queries received from the user in the current query session and each query suggestion of the plurality of query suggestions;

computing for each of the plurality of query suggestions a respective position of a selected search result that was previously provided in response to receiving the query suggestion as a search query;

computing a respective ranking score for each of the plurality of query suggestions based on the respective relevance score for each of the plurality of query suggestions and the respective position of the selected search result that was previously provided in response to receiving the query suggestion as a search query;

ranking the plurality of query suggestions according to the computed ranking score for each of the plurality of query suggestions; and providing one or more highest-ranked query suggestions to the user in response to receiving the first search query.

8. The system of claim 7, wherein the plurality of queries received from the user in the current query session are user refinements of an original search query.

9. The system of claim 7, wherein the operations further comprise:
computing for each of the plurality of query suggestions a respective likelihood that the query suggestion will be selected by the user, wherein computing the ranking score for the query suggestion comprises computing the ranking score based on the likelihood that the query suggestion will be selected by the user.

10. The system of claim 7, wherein the operations further comprise:
computing for each of the plurality of query suggestions a respective position of a selected search result that was previously provided in response to receiving the query suggestion as a search query, wherein computing the ranking score for the query suggestion comprises computing the ranking score based on the position of the selected search result that was previously provided in response to receiving the query suggestion as a search query.

11. The system of claim 7, wherein computing the respective relevance score between the plurality of queries received from the user in the current query session and each query suggestion of the plurality of query suggestions comprises:
computing a correlation score between core terms in the first query and one or more core terms in each of the plurality of queries received from the user in the current query session.

12. The system of claim 11, wherein the operations further comprise determining aligned terms between the core terms in the first query and the one or more core terms in each of the plurality of queries received from the user in the current query session.

13. The system of claim 12, wherein a correlation score between aligned terms is based on a function of a plurality of weights, each weight corresponding to a respective relationship between the aligned terms, wherein the relationships between the aligned terms include one or more of a synonym relationship, an acronym relationship, an antonym relationship, a compound phrase relationship, or a same category relationship.

14. A computer program product, encoded on one or more non-transitory computer storage media, comprising instructions that when executed by one or more computers cause the one or more computers to perform operations comprising:

receiving a first search query from a user associated with a user device;

obtaining a plurality of queries received from the user in a current query session, the plurality of queries including the first search query and one or more queries received from the user before the first search query;

generating a plurality of query suggestions for the first search query including replacing one or more first terms occurring in the first search query with one or more second terms;

computing a respective relevance score between the plurality of queries received from the user in the current query session and each query suggestion of the plurality of query suggestions;

computing for each of the plurality of query suggestions a respective position of a selected search result that was previously provided in response to receiving the query suggestion as a search query;

computing a respective ranking score for each of the plurality of query suggestions based on the respective relevance score for each of the plurality of query suggestions and the respective position of the selected search result that was previously provided in response to receiving the query suggestion as a search query;

ranking the plurality of query suggestions according to the computed ranking score for each of the plurality of query suggestions; and providing one or more highest-ranked query suggestions to the user in response to receiving the first search query.

15. The computer program product of claim 14, wherein the plurality of queries received from the user in the current query session are user refinements of an original search query.

16. The computer program product of claim 14, wherein the operations further comprise:

computing for each of the plurality of query suggestions a respective likelihood that the query suggestion will be selected by the user, wherein computing the ranking score for the query suggestion comprises computing the ranking score based on the likelihood that the query suggestion will be selected by the user.

17. The computer program product of claim 14, wherein the operations further comprise:

computing for each of the plurality of query suggestions a respective position of a selected search result that was previously provided in response to receiving the query suggestion as a search query, wherein computing the ranking score for the query suggestion comprises computing the ranking score based on the position of the selected search result that was previously provided in response to receiving the query suggestion as a search query.

18. The computer program product of claim 14, wherein computing the respective relevance score between the plurality of queries received from the user in the current query session and each query suggestion of the plurality of query suggestions comprises:

computing a correlation score between core terms in the first query and one or more core terms in each of the plurality of queries received from the user in the current query session.

19. The computer program product of claim 18, wherein the operations further comprise determining aligned terms between the core terms in the first query and the one or more core terms in each of the plurality of queries received from the user in the current query session.

20. The computer program product of claim 19, wherein a correlation score between aligned terms is based on a function of a plurality of weights, each weight corresponding to a respective relationship between the aligned terms, wherein the relationships between the aligned terms include one or more of a synonym relationship, an acronym relationship, an antonym relationship, a compound phrase relationship, or a same category relationship.

* * * * *